Patented Sept. 12, 1944

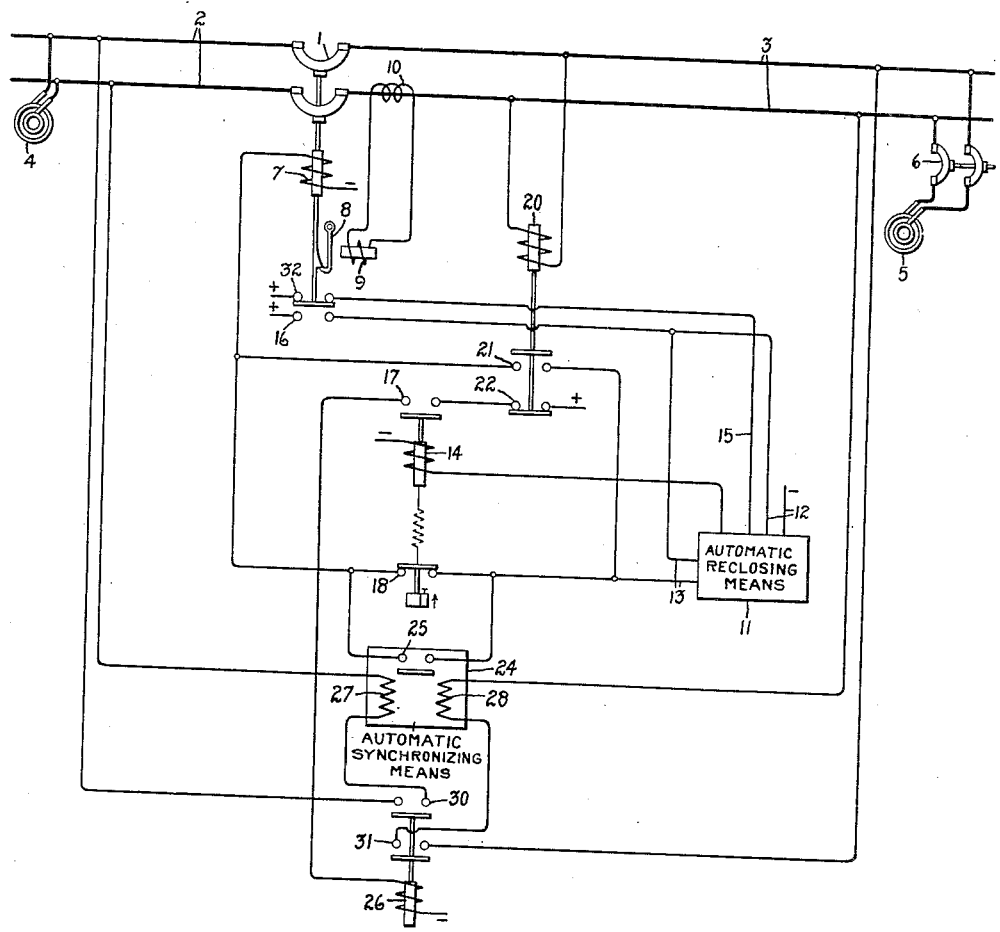

2,358,136

UNITED STATES PATENT OFFICE 2,358,136

AUTOMATIC RECLOSING CIRCUIT BREAKER EQUIPMENT

Arvid E. Anderson, Haverford Township, Delaware County, and Waldo P. Simpson, Lansdowne, Pa., assignors to General Electric Company, a corporation of New York Application December 2, 1942, Serial No. 467,606

12 Claims. (Cl. 175—294)

Our invention relates to automatic reclosing circuit breaker equipments and particularly to such equipments which are arranged to connect a supply circuit to a load circuit that may or may not be energized from another supply circuit at the time the circuit breaker is reclosed.

One object of our invention is to provide an arrangement of apparatus whereby the first automatic reclosure is effected independently of the voltage condition of the load circuit and whereby a predetermined number of subsequent reclosures at predetermined time intervals after the initial opening of the breaker is effected in case the circuit breaker fails to remain closed after each reclosure and the load circuit is not energized from some other source, and whereby, when the load circuit is energized from some other source, the subsequent reclosures are effected at the expiration of said predetermined time intervals only in case a predetermined relationship also exists between the supply and load circuit voltages.

Our invention will be better understood from the following description when taken in connection with the accompanying drawing, the single figure of which diagrammatically illustrates an automatic reclosing circuit breaker system embodying our invention, and its scope will be pointed out in the appended claims.

Referring to the drawing, 1 represents a circuit breaker which, when closed, connects an alternating current supply circuit 2 to an alternating current load circuit 3. The supply circuit 2 is shown as being energized by a source of current 4, and the load circuit 3 is shown as having another source of current 5 connected thereto by a suitable circuit breaker 6. While we have shown single phase circuits in order to simplify the disclosure, it will be obvious that our invention is also applicable to polyphase circuits.

The circuit breaker 1 is shown as a latched closed breaker having a closing coil 7, a latch 8 for holding the circuit breaker in its closed position, and a trip coil 9 connected in series relationship with the load circuit 3 by means of a current transformer 10 so that the trip coil 9 is sufficiently energized to release the latch 8 when the current through the circuit breaker 1 exceeds a predetermined value.

For effecting the automatic reclosing of the circuit breaker 1, we provide suitable automatic reclosing means, examples of which are well known in the art, for effecting a predetermined number of reclosures of the circuit breaker within a predetermined time interval after the first opening of the circuit breaker and with predetermined time intervals between successive reclosures of the breaker. Since such automatic reclosing means are well known in the art and the detailed circuits thereof form no part of our present invention, we have represented such automatic reclosing means in the drawing by a suitably labeled rectangle 11. United States Letters Patent 2,202,722, granted May 28, 1940, on an application filed by A. E. Anderson and assigned to the assignee of this application, discloses the detailed circuits of an automatic reclosing arrangement which may be used in the embodiment shown in the drawing. Such an automatic reclosing arrangement includes a starting circuit 12 which, when energized, initiates the operation of the reclosing means 11, a reclosing circuit 13 which is arranged to be completed for a predetermined time interval at predetermined points during the cycle of operation of the reclosing means 11 in case the circuit breaker 1 is open, a control relay 14 which is energized while the reclosing means 11 is in operation, and a release circuit 15 which is arranged to be completed to effect the movement of the reclosing means 11 from its lockout position to its normal position if the circuit breaker 1 is closed when the reclosing means reaches its lockout position. In the particular embodiment of our invention shown in the drawing, the reclosing means 11 is preferably arranged to effect an instantaneous initial reclosure of the reclosing circuit 13 and a predetermined number of subsequent closures of the reclosing circuit 13 at predetermined points during the cycle of operation of the reclosing means. The starting circuit 12 of the automatic reclosing means is arranged to be completed in the arrangement shown by the circuit breaker 1 closing its auxiliary contacts 16 when it opens. The control relay 14, which is energized as long as the reclosing means 11 is in operation, is provided with contacts 17 which are closed as soon as the relay is energized and with contacts 18 which are normally closed and which are arranged to be opened after the relay has been energized for a predetermined time interval. The contacts 18, when closed, connect the closing coil 7 of the circuit breaker 1 to the reclosing circuit 13 so that the first completion of the reclosing circuit 13 by the automatic reclosing means 11, which occurs immediately after the operation of the automatic reclosing means 11 is initiated and before the relay 14 can effect the opening of the contacts 18, effects the reclosing of the circuit breaker 1. The time setting of the relay contacts 18, however, is such that they are opened by the time the automatic reclosing means 11 effects the second completion of the reclosing circuit 13 during the cycle of operation of the automatic reclosing means. In order that the circuit breaker 1 may be reclosed each time the reclosing circuit 13 is completed by the automatic reclosing means 11 in case the load circuit 3 is also deenergized at the time of each such subsequent completion of the reclosing circuit, we provide a voltage relay 20 which is responsive to the voltage of the load circuit 3 and which is arranged to close its contacts 21 when the load circuit voltage is below a predetermined value. The contacts 21 are connected in parallel with the contacts 18 of relay 14 so that the closing coil 7 of the circuit breaker 1 is connected to the reclosing circuit 13 when either the contacts 21 or the contacts 18 are closed. The voltage relay 20 is also provided with the contacts 22 which are arranged to be closed when the load circuit voltage is above a predetermined value.

When the circuit breaker 1 is open and the load circuit 3 is energized from another source such as 5, it is desirable to reclose the circuit breaker 1 only in case the circuits 2 and 3 are in synchronism. In order to accomplish this result, we provide suitable automatic synchronizing means 24 which is arranged to close its contacts 25 in parallel with the contacts 13 and 21 when a predetermined phase relationship exists between the voltages of the two circuits 2 and 3. Since automatic synchronizing means are well known in the art and the detailed circuit connections thereof form no part of our present invention, we have here shown such means by a suitably labeled rectangle enclosing the contacts 25 and two windings 27 and 28. As shown, the automatic synchronizing means 24 is rendered operative by a control relay 26 connecting the operating windings 27 and 28 respectively across the circuits 2 and 3. The control relay 26 is arranged to be energized when the voltage of the load circuit 3 is above a predetermined value so that the contacts 22 of voltage relay 20 are closed and the contacts 17 of the control relay 14 are also closed.

The operation of the embodiment of our invention shown in the drawing is as follows. When the circuit breaker 1 is closed and the current supplied from the supply circuit 2 to the load circuit 3 is below a predetermined value, the various control devices are in the positions in which they are shown in the drawing. When a fault occurs which causes the trip coil 9 to release the latch 8 and effect the opening of the circuit breaker 1, the closing of the auxiliary contacts 16 on the circuit breaker 1 completes the starting circuit 12 to initiate the operation of the automatic reclosing means 11 and the energization of the control relay 14. However, before the control relay 14 can open its time delay contacts 18, the automatic reclosing means 11 completes the reclosing circuit 13 and thereby establishes through the contacts 18 an energizing circuit for the closing coil 7 to reclose the circuit breaker 1.

If the fault is still connected to the load circuit 3 at the time of the first reclosure, the trip coil 9 again effects the opening of the circuit breaker. After the initial completion of the reclosing circuit 13, a relatively long time interval elapses before the automatic reclosing means effects the next completion thereof so that by the time the reclosing circuit 13 is again completed, the relay 14 has opened its contacts 18. If at the time the reclosing means 11 effects the next completion of the reclosing circuit 13 the load circuit 3 is not being supplied from another source such as 5 and, therefore, the contacts 21 of the voltage relay 20 are closed, the closing coil 7 is energized through the contacts 21 to effect a second reclosure of the circuit breaker 1. If the load circuit 3 is energized at the time the reclosing means 11 effects the second completion of the reclosing circuit 13, the closing coil 7 is energized to reclose the circuit breaker only in case the contacts 25 of the automatic synchronizing means 24 are closed at the same time. It will be obvious that when the load circuit voltage is above a predetermined value so that the contacts 22 of the voltage relay 20 are closed at the same time the contacts 17 of the control relay 14 are closed, an energizing circuit is completed for the control relay 26 which, in turn, by closing its contacts 30 and 31 renders the automatic synchronizing means 24 operative. If, however, the circuit 3 is energized but the circuits 2 and 3 are not in synchronism when the automatic reclosing means effects the second completion of the reclosing circuit 13, no reclosure of the circuit breaker 1 occurs while the automatic reclosing means maintains the reclosing circuit 13 completed.

Similarly, during the cycle of operation of the automatic reclosing means 11, each additional completion of the reclosing circuit 13 established thereby effects a reclosure of the circuit breaker 1 in case it is open and either the load circuit voltage is below a predetermined value so that the contacts 21 of the voltage relay 20 are closed or the circuits 2 and 3 are in synchronism so that the contacts 25 of the automatic synchronizing means 24 are closed. If, however, the load circuit 3 is energized from another source 5 and the circuits 2 and 3 are not in synchronism while the reclosing circuit 13 is completed by the automatic reclosing means 11, no reclosure of the circuit breaker 1 occurs.

If the circuit breaker 1 is open after the automatic reclosing means 11 has been in operation for a predetermined time interval so that it has reached its lockout position, in which position the control relay 14 is deenergized, further completions of the energizing circuits are prevented in a manner well known in the art. However, if the circuit breaker 1 is closed so that its auxiliary contacts 32 are closed when the automatic reclosing means 11 reaches its lockout position, the release circuit 15 is completed to effect in a well-known manner the restoration of the automatic reclosing means 11 from its lockout position to its normal position so that it is again operative to effect further reclosures of the circuit breaker 1.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States, is:

1. An arrangement for reclosing an automatic circuit breaker which interconnects an alternating current supply circuit and an alternating current load circuit that is adapted to be energized independently of the supply circuit comprising means responsive to the initial opening of said circuit breaker for effecting the initial reclosure thereof independently of the voltage condition of said load circuit, means for effecting another reclosure of said circuit breaker at the expiration of a predetermined time interval after the initial opening of said circuit breaker if it is then open and the voltage of said load circuit is below a predetermined value, and means for effecting another reclosure of said circuit breaker at the expiration of a predetermined time interval after the initial opening of said circuit breaker if the voltage of said load circuit is above a predetermined value and a predetermined relationship exists between the voltages of said circuits.

2. An arrangement for reclosing an automatic circuit breaker which interconnects an alternating current supply circuit and an alternating current load circuit that is adapted to be energized independently of the supply circuit comprising means responsive to the initial opening of said circuit breaker for effecting the initial reclosure thereof independently of the voltage condition of said load circuit, automatic synchronizing means controlled by the phase relationship of said circuit voltages, and means for rendering said automatic synchronizing means operative to effect the reclosing of said circuit breaker for only a predetermined time at the expiration of a predetermined time interval after the initial opening of said circuit breaker.

3. An arrangement for reclosing an automatic circuit breaker which interconnects an alternating current supply circuit and an alternating current load circuit that is adapted to be energized independently of the supply circuit comprising means responsive to the initial opening of said circuit breaker for effecting the initial reclosure thereof independently of the voltage condition of said load circuit, automatic synchronizing means controlled by the phase relationship of said circuit voltages, and means for rendering said automatic synchronizing means operative to effect the reclosing of said circuit breaker for only a predetermined time at the expiration of each of a predetermined number of different time intervals after the initial opening of said circuit breaker.

4. An arrangement for reclosing an automatic circuit breaker which interconnects an alternating current supply circuit and an alternating current load circuit that is adapted to be energized independently of the supply circuit comprising means responsive to the initial opening of said circuit breaker for effecting the initial reclosure thereof independently of the voltage condition of said load circuit, automatic synchronizing means controlled by the phase relationship of said circuit voltages, and means for rendering said automatic synchronizing means operative to effect the reclosing of said circuit breaker for only a predetermined time at the expiration of each of a predetermined number of different time intervals after the initial opening of said circuit breaker and for preventing further reclosures of said circuit breaker if it is open at the expiration of a predetermined time interval after the initial opening thereof.

5. An arrangement for reclosing an automatic circuit breaker which interconnects an alternating current supply circuit and an alternating current load circuit that is adapted to be energized independently of the supply circuit comprising automatic synchronizing means controlled by the phase relationship of said circuit voltages, and means for rendering said automatic synchronizing means operative to effect the reclosing of said circuit breaker for only a predetermined time at the expiration of a predetermined time interval after the initial opening of said circuit breaker.

6. An arrangement for reclosing an automatic circuit breaker which interconnects an alternating current supply circuit and an alternating current load circuit that is adapted to be energized independently of the supply circuit comprising automatic synchronizing means controlled by the phase relationship of said circuit voltages, and means for rendering said automatic synchronizing means operative to effect the reclosing of said circuit breaker for only a predetermined time at the expiration of each of a predetermined number of different time intervals after the initial opening of said circuit breaker and for preventing further reclosures if the circuit breaker is open at the expiration of a predetermined time interval after the initial opening thereof.

7. An arrangement for reclosing an automatic circuit breaker which interconnects an alternating current supply circuit and an alternating current load circuit that is adapted to be energized independently of the supply circuit comprising automatic synchronizing means controlled by the phase relationship of said circuit voltages, means for rendering said automatic synchronizing means operative to effect the reclosing of said circuit breaker for only a predetermined time at the expiration of a predetermined time interval after the initial opening of said circuit breaker, and means controlled by the voltage of said load circuit for effecting the immediate reclosure of said circuit breaker at the expiration of said predetermined time interval if the voltage of said load circuit is then below a predetermined value.

8. An arrangement for reclosing an automatic circuit breaker which interconnects an alternating current supply circuit and an alternating current load circuit that is adapted to be energized independently of the supply circuit comprising automatic synchronizing means controlled by the phase relationship of said circuit voltages, means for rendering said automatic synchronizing means operative to effect the reclosing of said circuit breaker for only a predetermined time at the expiration of each of a predetermined number of different time intervals after the initial opening of said circuit breaker, and means controlled by the voltage of said load circuit for effecting the immediate reclosure of said circuit breaker at expiration of each of said time intervals if the voltage of said load circuit is then below a predetermined value.

9. An arrangement for reclosing an automatic circuit breaker which interconnects an alternating current supply circuit and an alternating current load circuit that is adapted to be energized independently of the supply circuit comprising automatic synchronizing means controlled by the phase relationship of said circuit voltages, means for rendering said automatic synchronizing means operative to effect the reclosing of said circuit breaker for only a predetermined time at the expiration of each of a predetermined number of different time intervals after the initial opening of said circuit breaker, means controlled by the voltage of said load circuit for effecting the immediate reclosure of said circuit breaker at expiration of each of said time intervals if the voltage of said load circuit is then below a predetermined value, and means for preventing further reclosures of said circuit breaker if it is open at the expiration of a predetermined time interval after the initial opening thereof.

10. An arrangement for reclosing an automatic circuit breaker which interconnects an alternating current supply circuit and an alternating current load circuit that is adapted to be energized independently of the supply circuit comprising means responsive to the initial opening of said circuit breaker for effecting the initial reclosure thereof independently of the voltage condition of said load circuit, automatic synchronizing means controlled by the phase relationship of said circuit voltages, means for rendering said automatic synchronizing means operative to effect the reclosing of said circuit breaker for only a predetermined time at the expiration of a predetermined time interval after the initial opening of said circuit breaker, and means controlled by the voltage of said load circuit for effecting the immediately reclosure of said circuit breaker at the expiration of said predetermined time interval if the voltage of said load circuit is then below a predetermined value.

11. An arrangement for reclosing an automatic circuit breaker which interconnects an alternating current supply circuit and an alternating current load circuit that is adapted to be energized independently of the supply circuit comprising means responsive to the initial opening of said circuit breaker for effecting the initial reclosure thereof independently of the voltage condition of said load circuit, automatic synchronizing means controlled by the phase relationship of said circuit voltages, means for rendering said automatic synchronizing means operative to effect the reclosing of said circuit breaker for only a predetermined time at the expiration of each of a predetermined number of different time intervals after the initial opening of said circuit breaker, and means controlled by the voltage of said load circuit for effecting the immediate reclosure of said circuit breaker at the expiration of each of said time intervals if the voltage of said load circuit is then below a predetermined value.

12. An arrangement for reclosing an automatic circuit breaker which interconnects an alternating current supply circuit and an alternating current load circuit that is adapted to be energized independently of the supply circuit comprising means responsive to the initial opening of said circuit breaker for effecting the initial reclosure thereof independently of the voltage condition of said load circuit, automatic synchronizing means controlled by the phase relationship of said circuit voltages, means for rendering said automatic synchronizing means operative to effect the reclosing of said circuit breaker for only a predetermined time at the expiration of each of a predetermined number of different time intervals after the initial opening of said circuit breaker, means controlled by the voltage of said load circuit for effecting the immediate reclosure of said circuit breaker at the expiration of each of said time intervals if the voltage of said load circuit is then below a predetermined value, and means for preventing further reclosures of said circuit breaker if it is open at the expiration of a predetermined time interval after the initial opening thereof.

ARVID E. ANDERSON.
WALDO P. SIMPSON.